United States Patent [19]
Carol, Jr.

[11] 3,774,449
[45] Nov. 27, 1973

[54] FUEL LEVEL SENSOR FOR A ROTATING FUEL TANK
[75] Inventor: John A. Carol, Jr., Flint, Mich.
[73] Assignee: General Motors Corporation, Detroit, Mich.
[22] Filed: Oct. 16, 1972
[21] Appl. No.: 297,917

[52] U.S. Cl. .................. 73/313, 137/344, 338/33, 340/177 R
[51] Int. Cl. .......................................... G01f 23/10
[58] Field of Search .................. 73/313; 340/177 R; 338/33; 310/232; 137/344

[56] References Cited
UNITED STATES PATENTS

| | | | |
|---|---|---|---|
| 3,027,551 | 3/1962 | Laurin | 340/177 R |
| 3,050,718 | 8/1962 | Giel | 340/177 R X |
| 2,151,793 | 3/1939 | Patin | 340/177 P X |
| 3,208,059 | 9/1965 | Ziegler | 73/313 X |
| 2,551,030 | 5/1951 | Madden | 310/232 |

Primary Examiner—Richard C. Queisser
Assistant Examiner—Daniel M. Yasich
Attorney—C. R. Meland et al.

[57] ABSTRACT

A fuel level sensor for a cylindrical fuel tank carried by a rotating tubular shaft. A first slip ring assembly includes a first slip ring which carries a potentiometer resistive element and a float which rotates the slip ring and the resistive element to an angular position relative to a vertical reference representing the level of fuel in the fuel tank. A second slip ring assembly includes a second slip ring which carries a potentiometer wiper arm cooperating with the resistive element and a weighted arm which maintains the second slip ring and the wiper arm at a predetermined angular position relative to the vertical reference. The resistive element and the wiper arm cooperate to present an impedance representing fuel level. Means are described for transferring a resistance signal representing the level of fuel from within the rotating fuel tank.

3 Claims, 4 Drawing Figures

PATENTED NOV 27 1973  3,774,449

FUEL LEVEL SENSOR FOR A ROTATING FUEL TANK

This invention relates to an apparatus for providing an indication of the level of fuel in a rotating fuel tank.

Due to the increasing size of the engines in off-the-road equipment, such as farm tractors, less space is available to accommodate the fuel tank in its conventional location thereby making it desirable to relocate the fuel tank. One solution which has been suggested is the provision of a circular fuel tank as a part of the large rear wheel of a tractor or mounted on the drive axle thereof and, hence, rotated thereby. In addition to this form of fuel tank, it has been suggested that a circular rolling tank be used in the transporting of fuel or other liquids. It is the general object of this invention to provide a level sensor for a rotating liquid carrier.

It is another object of this invention to provide a level sensor for a rotating liquid carrier which is unaffected by the rotation or rate of rotation of the carrier.

It is another object of this invention to provide a fuel level sensor for a rotating fuel tank.

These and other objects of this invention may be better understood by reference to the following description of a preferred embodiment and the figures in which.

Figure 1:
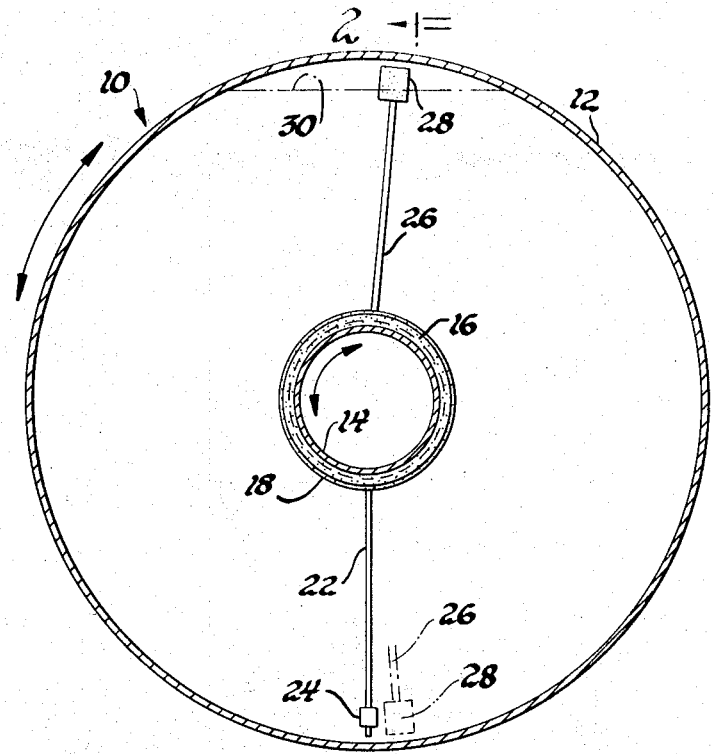
FIG. 1 is a schematic drawing of a rotating fuel tank including the fuel level sensor of this invention.
Figure 2:
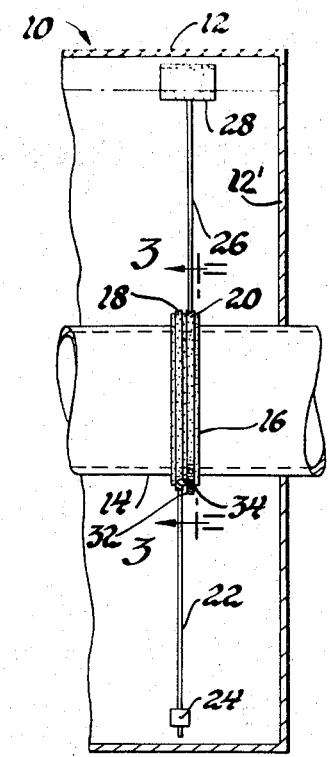
FIG. 2 is a schematic drawing taken along lines 2—2 of FIG. 1.

Referring to FIGS. 1 and 2, a rotating fuel tank 10 includes an outer shell 12 which is carried by an electrically grounded tubular shaft 14 and two end plates which define an enclosure for holding a liquid for use or for transportation. The shaft 14 is shown in FIG. 2 as sealingly passing through an end plate 12'. The tubular shaft 14 could, for example, be secured to or be a portion of a tractor rear axle. An annular electrically insulating slip ring retainer 16 is secured to the tubular shaft 14 for rotation therewith and has a pair of circumferentially formed grooves for carrying electrically insulting slip rings 18 and 20, the circumferentially formed grooves maintaining a spaced relationship between the slip rings 18 and 20 and allowing relative rotational movements between the slip ring retainer 16 and the slip rings 18 and 20.

An arm 22 is secured to the slip ring 18 and carries a weight 24. The arm 22 and the weight 24 cooperate to maintain the slip ring 18 at a constant angular position relative to local vertical, this position being maintained even though the tubular shaft 14 is rotating.

A float arm 26 has one end secured to the slip ring 20. A float 28 is mounted on the other end thereof and positions the float arm 26 and the slip ring 20 to an angular position relative to local vertical determined by the level of fuel in the fuel tank 10. Consequently, the angular position of the slip ring 20 relative to the slip ring 18 represents the level of fuel in the fuel tank 10. For purposes of illustration, the fuel in the fuel tank assembly is shown to be at a level 30. As can be seen, upon rotation of the tubular shaft 14, the float arm 26 and the float 28 maintain the slip ring 20 at a specified angular position relative to the slip ring 18 which is a function of the level of fuel in the tank. As the level of fuel in the fuel tank assembly 10 decreases from the level 30, the float 28 and the float arm 26 rotate the slip ring 20 relative to the the slip ring 18 in accordance with the decreasing fuel level change.

A potentiometer resistive element 32 is circumferentially carried by the slip ring 20 and a potentiometer wiper arm 34 is carried by the slip ring 18 and cooperates with the resistive element 32 on the slip ring 20 to establish a resistance which is a function of the angular position between the float arm 26 and the arm 22 and consequently the level of fuel in the fuel tank 10 as will hereinafter be described with reference to FIG. 3.

Figure 3:
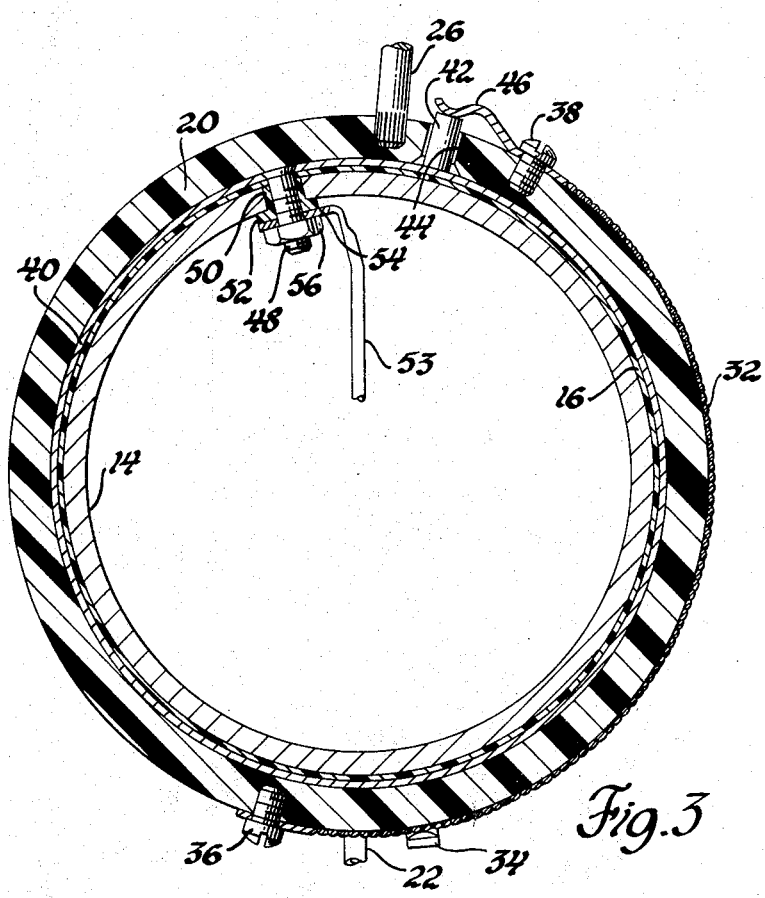
FIG. 3 is a detailed schematic of the potentiometer assembly and the means for transferring a resistance signal representing fuel level to a point external of the fuel tank taken along lines 3—3 of FIG. 2.

Referring to FIG. 3, the resistive element 32 is secured to the slip ring 20 by a screw 36 and a screw 38. As the arm 22 remains stationary along a local vertical, the angular position of the wiper arm 34 also remains stationary relative thereto. As the level of the fluid within the fuel tank 10 varies, the float arm 26 is moved to rotate the slip ring 18 and the resistive element 32 attached thereto relative to the wiper arm 34 so as to vary the resistance between the ends of the resistive element 32 and the wiper arm 34 in accordance with liquid level.

In order to present an impedance which is a function of fuel level to a point external of the fuel tank 10, such as a fuel level gauge, an annular conductive band 40 is affixed to the retainer 16 in the area beneath the slip ring 20. A brush contact 42 contacts the conductive band 40 through an opening 44 in the slip ring 20. An extension 46 of the resistive element 32 forms a spring contact which engages and applies a force to the brush contact 42. A threaded stud 48 is positioned through an opening in the tubular shaft 14 and within an electrical insulator and liquid seal 50 having a lip portion 52 engaging the inner surface of the core 14. The threaded stud 48 has a head whose outer surface is flush with the outer surface of the conductive band 40 and which has a tapered periphery engaging the conductive band 40. An electrical lead 53 includes a terminal 54 which is clamped between the lip 52 of the electrical insulator and fluid seal 50 and a nut 56 screwed onto the threaded stud 48. As can be seen, the extension 46 of the resistive element 32 is electrically coupled to the electrical lead 53 through the brush 42, the conductive band 40, the bolt 48 and the terminal 54.

Figure 4:
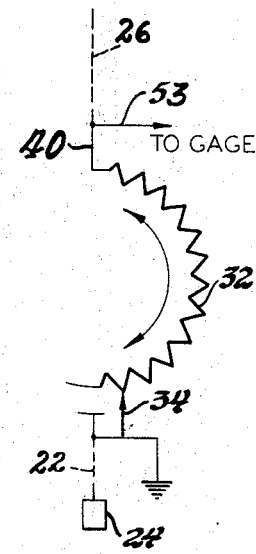
FIG. 4 is an electrical schematic of the fuel level sensor.

The potentiometer wiper arm 34 is grounded to the tubular shaft 14 in a manner similar to the manner in which the end 46 of the resistive element 32 is electrically coupled to the electrical lead 53 with the exception that the conductive band corresponding to the conductive band 40 is directly electrically coupled to the tubular shaft 14 instead of being insulated from it as schematically shown in FIG. 4.

As can be seen from the foregoing, the impedance between the conductive band 40 and the corresponding conductive band beneath the slip ring 18 and, consequently, the impedance between the terminal 54 and ground, is equal to the resistance of the portion of the resistive element 32 between the wiper arm 34 and the end 46. This impedance represents the angular position of the slip ring 20 which in turn is a function of the level of fuel in the fuel tank 10. This impedance can be used, for example, in a fuel gauge circuit for indicating the level of fuel in the fuel tank 10.

The electrical schematic of the fuel gauge is illustrated in FIG. 4 and includes the potentiometer resistive element 32 and corresponding potentiometer wiper arm 34. The wiper arm 34 is maintained stationary and is grounded and the potentiometer resistive element 32 is rotated relative to the wiper arm 34 to present a resistance to the electrical lead 53 which is a function of the angular position of the potentiometer resistive element 32.

Although in the preferred embodiment the resistive element 32 is moved relative to the wiper arm 34, it will be understood by one skilled in the art that the wiper arm 34 could be moved as a function of fuel level relative to the resistive element 32.

The detailed description of a preferred embodiment of the invention for the purpose of explaining the principles thereof is not to be considered as limiting or restricting the invention, since many modifications may be made to accomplish the same functions by the exercise of skill in the art without departing from the scope of the invention.

I claim:

1. A liquid level sensor for a cylindrical tank carried by a rotating shaft extending through its axis comprising:

slip ring retaining means secured to the shaft for rotation therewith;

first and second slip rings carried by the slip ring retaining means for rotation relative thereto;

a potentiometer assembly including a resistive element circumferentially disposed on the first slip ring and a wiper arm carried by the second slip ring and cooperating with the resistive element to present an impedance which is a function of the relative angular positions of the first and second slip rings;

means for maintaining one of said slip rings at a constant angular position relative to a vertical reference;

and means responsive to liquid level for rotating the other of said slip rings to an angular position relative to the vertical reference representing the liquid level in the tank, whereby the impedance presented by the resistive element and the wiper arm is independent from shaft and the carried tank rotation and represents the liquid level in the tank.

2. A fuel level sensor for a cylindrical fuel tank carried by a rotating shaft extending through its axis comprising:

slip ring retaining means secured to the shaft for rotation therewith;

first and second slip rings carried by the slip ring retaining means for rotation relative thereto;

a potentiometer assembly including a resistive element circumferentially disposed on the first slip ring and a wiper arm carried by the second slip ring and cooperating with the resistive element to present an impedance which is a function of the relative angular positions of the first and second slip rings;

a weight arm having a first end secured to one of said slip rings;

weight means secured to the remaining end of said weight arm, the weight arm and weight means maintaining said one of the slip rings at a constant angular position relative to a vertical reference;

a float arm having a first end secured to the other of said slip rings;

a float secured to the remaining end of the float arm, the float being operative to rotate said other of the slip rings to an angular position relative to the vertical reference representing the level of fuel in the fuel tank, whereby the impedance presented by the resistive element and the wiper arm is independent from shaft and the carried fuel tank rotation and represents the level of fuel in the fuel tank.

3. A fuel level sensor for a cylindrical tank carried by an electrically grounded rotating tubular member extending through its axis comprising:

electrically insulating slip ring retaining means secured to the shaft for rotation therewith;

first and second spaced conducting bands circumferentially disposed on the slip ring retaining means;

first and second electrically insulating slip rings carried by the slip ring retaining means over the first and second conducting bands respectively;

a potentiometer assembly including a resistive element circumferentially disposed on the first slip ring and a wiper arm carried by the second slip ring and cooperating with the resistive element;

a first brush contact extending through the first slip ring and engaging the first conducting band;

means electrically coupling one end of the resistive element to the first brush contact;

contact means extending through the tubular member and engaging the first conductive band;

means electrically insulting the last mentioned means from the tubular member;

a second brush contact extending through the second slip ring and contacting the second conducting band;

means electrically coupling the wiper arm to the second brush contact;

means electrically coupling the second band to the tubular member so as to electrically ground said second band;

means for maintaining one of said slip rings at a constant angular position relative to a vertical reference;

and means responsive to the level of fuel in the tank for rotating the other of said slip rings to an angular position relative to the vertical reference representing the level of fuel in the fuel tank, whereby the impedance between the first and second conducting bands and between the contact means and ground represents the level of fuel in the fuel tank.

* * * * *